Jan. 1, 1935.  H. ZIMMERMANN  1,986,701
BOTTOM SEAL FOR GATES OR THE LIKE
Filed March 20, 1933
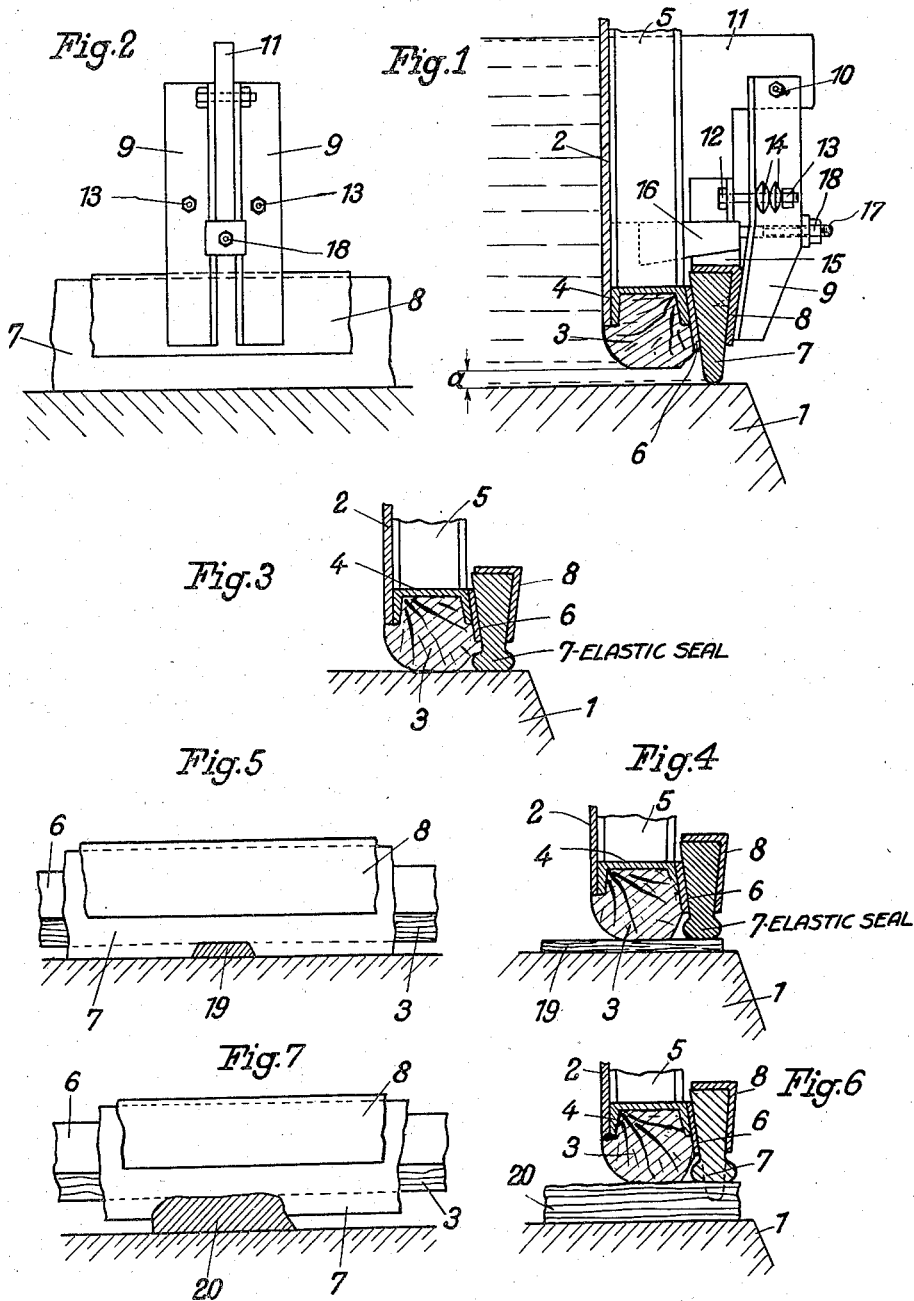
Inventor:
H. Zimmermann
By: Marks & Clerk
Attys.

Patented Jan. 1, 1935

1,986,701

UNITED STATES PATENT OFFICE 1,986,701

BOTTOM SEAL FOR GATES OR THE LIKE

Hans Zimmermann, Dortmund, Germany, assignor to the firm Vereinigte Stahlwerke Aktiengesellschaft, Dusseldorf, Germany Application March 20, 1933, Serial No. 661,832
In Germany January 25, 1933

3 Claims. (Cl. 61—22)

The invention relates to movable dams and its object is the improvement of the seal between the gate and the sill. Often this seal is desired to be perfectly watertight, particularly to avoid the abrasing action on the sill and on the neighbouring parts of the gate effected by the sand driven by the water current. If only a resistant and not elastic seal, for instance a wooden beam is used a perfect tightness cannot be obtained, because often small objects are caught between the beam and the sill when the gate comes to be set upon the sill so that a narrow gap rests between the beam and the sill. Otherwise, if only an elastic seal is used, for instance and adjustable hinged movable apron or the like, the seal is exposed to injury when a large object is caught between the seal and the sill.

The invention removes the disadvantages of a single not elastic but resisting seal and of a single elastic but sensible or low resistant seal by using the combination of a resisting bottom seal with an adjustable elastic bottom seal, the combination being thus performed, that the elastic seal is protected against damage by the resistant seal. A further advantage is realized by the invention in so far as the elastic seal can be adjusted without releasing its connection with the gate construction and without executing a considerable adjusting power.

In the case that an object is caught between seal and sill the resistant seal will protect the elastic one against damage; nevertheless the perfect tightness is maintained, even if fine sand or similar objects are caught between the resistant seal and the sill, if only their thickness does not exceed the adjustable zone of the elastic seal.

In Figures 1–7 the invention is designed in due manner; by way of example, a seal composed according to the present invention Fig. 1 is a cross section of the bottom seal and of the sill of a dam showing the elastic seal just touching the sill, Fig. 2 is a side view of the bottom seal, Fig. 3 is a cross section of the bottom seal and of the sill showing the resistant and the elastic seal when seated close on the sill, Fig. 4 is a cross section of the bottom seal showing an object being caught between the resistant seal and the sill, the thickness of which does not exceed the adjustable zone of the elastic seal, Fig. 5 is a side view of Fig. 4, Fig. 6 is a cross section of the bottom seal showing an object being caught between the resistant seal and the sill, the thickness of which is bigger than the adjustable zone of the elastic seal, Fig. 7 is a side view of Fig. 6.

In these figures 1 is the sill, 2 the skin plate of the gate, 3 a wooden beam used as the resisting seal, which is attached to the gate by means of the channel 4. 5 is a stiffening bar of the skin plate, 6 a flat steel at the downstream side of the beam 3 to which the additional elastic seal 7 of tapered cross section is pressed. The elastic seal for example is made of india rubber. 8 is an angle iron forming the downstream side frame of the elastic seal. 9 are a couple of angle irons or the like which are attached to a plate 11 by a bolt 10, allowing them to swing sidewards. The screw 12 and the nut 13 in combination with the spring plates 14 serve to press the angle irons 9 against the frame angle iron 8 with such a power that the seal 7 is prevented from slipping. 15 is a tapered shaped plate attached to the frame angle iron 8. Between that plate and the lower end of the plate 11 a wedge 16 is situated which can be laterally displaced by means of a screw 17 and a nut 18. By turning the nut 18 the wedge 16 can be drawn to the downstream side, and the frame angle iron 8 and so the seal 7 can be pressed down without the screw 12, 13 being released, because the spring 14 allows the angle irons 9 to swing around the bolt 10 to a certain extent.

As shown in the drawing the elastic seal 7 cannot be deformed by objects 19, 20 which are caught between the resistant seal 3 and the sill more than it sticks over the bases of the resistant seals (see distance "a" in Fig. 1). If the object 19 is thinner than the distance a as shown in the Figures 4 and 5 the perfect tightening is maintained, because the elastic seal 7 surrounds closely the object 19 and at both sides of the object 19 is in close contact with the sill. If the object is thicker than the distance a as shown in the Figures 6 and 7 no tightness is obtained between the seal and the sill and the gate must be a little raised again to let pass the object 20 to the downstream side. Nevertheless the elastic seal 7 cannot be damaged even in this case because as shown in Figs. 6 and 7, it cannot be more deformed than is limited by the distance a.

Instead of the wooden beams 3 another resisting seal, for instance of steel, may be adopted. Instead of the tapered shaped seal 7 and its connecting and adjusting means 8 to 18 a seal of another shape and other connecting and adjusting means may be used, for instance screws which can be adjusted from the gate's top instead of the wedges.

All those means are covered by the main principle of the invention that is the combination of a resistant seal with an elastic seal in such arrangement, that the latter is situated in the zone protected by the former and can be adjusted. In that arrangement such a connection of the elastic seal with the gate is of great advantage and performed by the invention that the elastic seal can be adjusted without releasing its connection with the gate.

What I claim and desire to secure by Letters Patent of the United States is:

1. A bottom seal for a gate comprising in combination a resistant and an elastic seal mounted on the lower end of the gate, the resistant seal facing the up-stream side and the elastic seal the down-stream side.

2. A bottom seal for a gate comprising in combination a resistant and an elastic seal mounted on the lower end of the gate, the resistant seal facing the up-stream side and the elastic seal the down-stream side, the elastic seal being arranged adjacent the resistant seal and provided with a frame, securing means in the lower portion of the gate for pressing the elastic seal by means of its frame against the resistant seal, the frame and the elastic seal being adjustable in a vertical direction.

3. A bottom seal for a gate comprising in combination with the skin plate of the gate a resistant and an elastic seal mounted on the lower end of the gate, the resistant seal facing the up-stream side and the elastic seal the down-stream side, the elastic seal being arranged adjacent the resistant seal and having a tapered cross-section and consisting of a strip of elastic material while the resistant seal consists of a wooden beam, an angle iron enclosing two sides of the elastic seal, a plate transversely secured to the lower portion of the skin plate, a couple of angle irons pivotally mounted with the upper end on the outer portion of the said plate and lying with the lower end adjacent the said angle iron of the elastic seal, screw bolts attached to the plate and traversing the said couple of angle irons for pressing the same against the angle iron of the elastic seal, resilient washers for the screw bolts, a pair of wedges arranged on the upper side of the angle iron of the elastic seal in operative relation, one of the wedges being supported by the said angle iron while the other wedge is supported by the lower surface of the said plate and provided with an adjusting screw which is operatively connected with the couple of angle irons.

HANS ZIMMERMANN.